(12) United States Patent
Holtrop et al.

(10) Patent No.: US 6,340,000 B1
(45) Date of Patent: Jan. 22, 2002

(54) CLEANING POULTRY MANURE FROM SUPPORT SURFACES OF AN EGG-LAYING INSTALLATION

(75) Inventors: James S. Holtrop, Washington; John R. Wiedemann, Fenton, both of MO (US)

(73) Assignee: Solutia Inc., St. Louis, MO (US)

( * ) Notice: Subject to any disclaimer, the term of this patent is extended or adjusted under 35 U.S.C. 154(b) by 244 days.

(21) Appl. No.: 08/972,206

(22) Filed: Nov. 17, 1997

(51) Int. Cl.7 ............................................. A01K 31/04
(52) U.S. Cl. ...................................................... 119/442
(58) Field of Search .................. 119/442, 447, 119/479, 526, 347; 424/76.5, 76.6; 134/62, 27; 510/422; 523/157

(56) References Cited

U.S. PATENT DOCUMENTS

| | | | | |
|---|---|---|---|---|
| 3,274,973 A | * | 9/1966 | Woods et al. .............. 119/442 |
| 3,908,680 A | * | 9/1975 | Krezanoski ................. 134/27 |
| 3,941,091 A | * | 3/1976 | Fleshman ................... 119/457 |
| 4,014,805 A | * | 3/1977 | Castrantas ................. 523/157 |
| 5,365,878 A | * | 11/1994 | Dyer ......................... 119/347 |
| 5,514,588 A | * | 5/1996 | Varadaraj et al. ........... 424/76.5 |
| 5,551,460 A | * | 9/1996 | Runion ....................... 134/62 |
| 5,660,145 A | * | 8/1997 | Rumbaugh .................. 119/442 |
| H1680 H | * | 9/1997 | Prieto ......................... 510/422 |

OTHER PUBLICATIONS

"Pyrophosphates—Properties & I&I Applications", Monsanto, 17 pages, Oct. 1996.

* cited by examiner

Primary Examiner—Charles T. Jordan
Assistant Examiner—Elizabeth Shaw
(74) Attorney, Agent, or Firm—Lathrop & Gage L.C.

(57) ABSTRACT

A method of cleaning poultry manure from support surfaces of an egg-laying installation which comprises contacting the manure with an aqueous solution obtained by combining water and one or more compounds selected from alkali metal polyphosphates, organo-phosphonates, alkali metal salts of nitriloacetic acid and alkali metal salts of ethylene diamine tetraacetic acid.

5 Claims, No Drawings

CLEANING POULTRY MANURE FROM SUPPORT SURFACES OF AN EGG-LAYING INSTALLATION

BACKGROUND OF THE INVENTION

This invention relates to egg-laying installations and more particularly to a method of cleaning manure from support surfaces of such installations.

Egg-laying installations in the form of housings or pens typically contain poultry nests in the form of individual or multiple units of wooden, sheet metal or plastic boxes for the hens. Removable nest pads or liners are often used in the nests as cushions to support the hens and eggs. These usually are mats of rubber or non-woven or plastic material or molded coverings on wooden frames. A commercially popular nest pad is disclosed in U.S. Pat. No. 5,159,896, issued Nov. 3, 1992, the pad description of which is incorporated herein by reference. In brief, the pad is a colored, molded grass-like thermoplastic mat with openings in a matrix base to facilitate drainage through the pad during cleaning. These pads typically last about 3 to 5 years and, since egg production is enhanced in a clean environment, as well for economic reasons, they are cleaned after each flock of chickens lays its eggs before the next flock is introduced into the installation. Nest management time and expense in cleaning waste chicken manure from the various support surfaces of the egg-laying installation are desirably minimized. These various surfaces where a hen is likely to perch include the house floor, support slats, individual nest pads and the like. In the past such surfaces were cleaned by physically shaking, scraping or brushing manure from the surfaces or by soaking or spraying with water or a cleaning solution. Cleaning is quite difficult since the manure attaches like cement to the soiled surfaces, particularly to the protruding tufts or fingers of the grass-like pad of the '186 patent when that form of pad is used. Even after soaking in water for several days, many minutes of flushing at high pressure are required.

SUMMARY OF THE INVENTION

Now improvements have been made in cleaning poultry manure from support surfaces of egg-laying installations.

Accordingly, a principal object of this invention is to provide a method for cleaning poultry manure from support surfaces of an egg-laying installation.

A specific object is to provide such a method which is readily useable with removable poultry nest pads soiled with hardened chicken manure, particularly the grass-like mats disclosed in the '186 patent.

Other objects will in part be obvious and will in part appear from the following detailed description and claims.

These and other objects are accomplished by providing a method of cleaning poultry manure from support surfaces of an egg-laying installation which comprises contacting the manure with an aqueous solution obtained by combining water and one or more compounds selected from alkali metal polyphosphates, organo-phosphonates, alkali metal salts of nitriloacetic acid and alkali metal salts of ethylenediamine tetraacetic acid. The preferred compound is tetrapotassium polyphosphate.

DETAILED DESCRIPTION OF THE INVENTION

Water soluble compounds useful in the poultry manure cleaning solutions of the invention are selected from the group consisting of alkali metal polyphosphates, organo-phosphonates, alkali metal salts of nitriloacetic acid (NTA), alkali metal salts of ethylenediamine tetraacetic acid (EDTA) and mixtures thereof.

Polyphosphate compounds contain —P—O—P—bonds and include: a) pyrophosphate of the formula

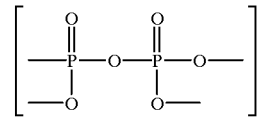

such as tetrasodium pyrophosphate (TSPP), tetrapotassium pyrophosphate (TKPP), and sodium acid pyrophosphate (SAPP); b) tripolyphosphates of the formula

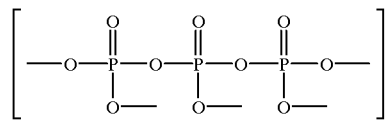

such as sodium tripolyphosphate (STPP), sodium potassium tripolyphosphate (SKTP), potassium tripolyphosphate (KTPP) and c) longer chain linear polyphosphates having 4 to 30 phosphorous atoms linked to oxygen atoms of the formula:

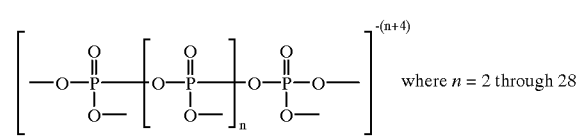 where $n$ = 2 through 28 where n=2 through 28
Such longer chain compounds include sodium hexametaphosphate and cyclic metaphosphates of the formula:

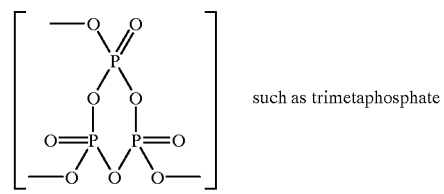 such as trimetaphosphate such as trimetaphosphate

Alkali metals are those of the 1st group of the Periodic table —i.e. lithium, sodium, potassium, rubidium and cesium.

Organo phosphonate compounds (including their alkali meta salts) contain one or more phosphonate groups —i.e.

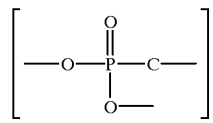

The carbon atoms of the phosphonate group(s) of these compounds are linked to two or more organic groups such as $C_1$–$C_5$ alkyl, amino, etc. Representative organo-phosphonates include amino tri [methylene phosphonic acid] (ATMP), 1-hydroxyethylidene-1, 1-diphosphonic acid (HEDP); and diethylenetriaminepenta [methylenphosphonic acid] (DTPMPA).

Polyphosphate compounds are preferred and TKPP most preferred since it is more soluble in water than other polyphosphates.

The water soluble compounds of the cleaning solution may be solid or liquid at room temperature atmospheric conditions. One or more may be mixed or blended together before or after combining with water.

Alkali metal polyphosphates, organo-phosphate compounds and NTA are available commercially from Solutia Inc., St. Louis, Missouri. EDTA is commercially available from Dow Chemical Co., Midland, Mich.

The invention is usable to clean poultry (i.e. chicken) manure from any support surface of an egg-laying installation such as a broiler-breeder house and is particularly useful in cleaning poultry nest pads of the type disclosed in the noted '896 patent. These pads set on slats in the poultry house and both pads and slats are typically covered with manure after use by a flock of chickens.

The liquid cleaning solution is conveniently sold in drums as a bulk concentrate of 50–60 wt. % in water which is then locally diluted to about 0.05 to 1 wt. % before cleaning use. Typically, a batch comprising a multitude of soiled nest pads of the '896 patent is soaked in the cleaning solution, optionally at elevated cleaning temperature of 80–95° C., for a period sufficient to soften the manure trapped in the pads and facilitate removal from the projections or clusters of the pads. If soaked sufficiently long the manure just falls away, but flushing with high pressure water to remove softened manure, usually after soaking for about 8 hours in a 0.05% solution, is preferred. To clean nest pad support slats, the cleaning solution is applied directly to the support surfaces, for example by fogging or spraying the entire interior of the poultry house followed by hosing down with water.

The following example illustrates and is not intended to limit the invention.

400 Astroturf® poultry pads of the type disclosed in the '896 patent were soaked overnight in a 0.03 percent solution obtained by combining TKKP and water. The next morning the pads were removed and sprayed with a high pressure water sprayer set at 1000 psi and the pads were cleaned in one minute. 400 pads not soaked in TKKP took about 15 minutes to clean with a high pressure water sprayer set at 3000 psi.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

What we claim is:

1. A method of cleaning poultry manure from support surfaces of an egg-laying installation which comprises contacting the manure with an aqueous solution obtained by combining water and one or more compounds selected from alkali metal polyphosphates, organo-phosphonates, alkali metal salts of nitriloacetic acid and alkali metal salts of ethylene diamine tetraacetic acid.

2. The method of claim 1 wherein the polyphosphate is tetrapotassium pyrophosphate.

3. The method of any of claims 1 or 2 including the step of flushing the surfaces with water after contacting with the solution.

4. A method of cleaning poultry nest pads which comprises: soaking poultry nest pads soiled with hardened poultry manure in an aqueous solution until the manure softens, said solution obtained by combining water and one or more members selected from the group consisting of alkali metal polyphosphates, organo-phosphonates, alkali metal salts of nitriloacetic acid and alkali metal salts of ethylene diamine tetraacetic acid; and then flushing the softened manure from the pads with pressurized/water.

5. The method of claim 4 wherein the polyphosphate is tetrapotassium pyrophosphate.

* * * * *